United States Patent
Tabata (10) Patent No.: US 10,171,696 B2
(45) Date of Patent: Jan. 1, 2019

(54) IMAGE PROCESSING APPARATUS AND IMAGE PROCESSING METHOD FOR RECOGNIZING CHARACTERS IN CHARACTER STRING REGIONS AND TABLE REGIONS ON A MEDIUM

(71) Applicants: KABUSHIKI KAISHA TOSHIBA, Tokyo (JP); TOSHIBA TEC KABUSHIKI KAISHA, Tokyo (JP)

(72) Inventor: Sunao Tabata, Sunto Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/401,484

(22) Filed: Jan. 9, 2017

(65) Prior Publication Data

US 2018/0198938 A1 Jul. 12, 2018

(51) Int. Cl.
*H04N 1/00* (2006.01)
*G06K 9/00* (2006.01)
(Continued)

(52) U.S. Cl.
CPC ..... *H04N 1/00803* (2013.01); *G06K 9/00449* (2013.01); *G06K 9/00456* (2013.01); (Continued)

(58) Field of Classification Search
CPC ... H04N 2201/0081; H04N 2201/0094; H04N 1/00331; H04N 1/00803; H04N 1/32475; (Continued)

(56) References Cited

U.S. PATENT DOCUMENTS

| 5,191,612 A * | 3/1993 | Katsuyama | G06K 9/346 358/462 |
| 5,881,381 A * | 3/1999 | Yamashita | G06F 17/246 715/209 |

(Continued)

FOREIGN PATENT DOCUMENTS

JP 2002-108527 4/2002

OTHER PUBLICATIONS

JP 2002-108527A (English abstract and machine translation of claims and specification.*

*Primary Examiner* — Scott A Rogers
(74) *Attorney, Agent, or Firm* — Patterson & Sheridan, LLP (57) ABSTRACT

An image processing apparatus includes an image reading unit, a character recognition unit, an operation unit, and a file generation unit. The image reading unit generates image information which includes at least one of a character string and a table. The character recognition unit recognizes characters and generates character information corresponding to each character included in one of the at least one of the character string and the table. The operation unit receives, from a user, a selected file format of an electronic file to be generated. The file generation unit generates an electronic file including the generated character information in accordance with the selected file format. The character recognition unit recognizes the characters and generates the character information in the generated image information in accordance with the one of the at least one of the character string and the table that corresponds to the selected file format.

20 Claims, 11 Drawing Sheets

(51) Int. Cl.
*G06K 9/20* (2006.01)
*G06K 9/34* (2006.01)

(52) U.S. Cl.
CPC ........... *G06K 9/2054* (2013.01); *G06K 9/344* (2013.01); *H04N 1/00331* (2013.01); *G06K 2209/01* (2013.01); *H04N 2201/0081* (2013.01); *H04N 2201/0094* (2013.01)

(58) Field of Classification Search
CPC ...... G06K 9/344; G06K 9/346; G06K 9/2054; G06K 9/00449; G06K 9/00456; G06K 2209/01
See application file for complete search history.

(56) References Cited

U.S. PATENT DOCUMENTS

| | | | |
|---|---|---|---|
| 8,116,568 B2* | 2/2012 | Daidoh | G06K 9/346 |
| | | | 382/182 |
| 8,891,871 B2* | 11/2014 | Eguchi | G06K 9/00449 |
| | | | 382/173 |
| 2016/0055376 A1* | 2/2016 | Koduru | G06K 9/00449 |
| | | | 382/176 |
| 2016/0104077 A1* | 4/2016 | Jackson, Jr. | G06N 99/005 |
| | | | 706/12 |

* cited by examiner

```
                                303
┌─────────────────────────────┐
│     ┌────┬─────┬────┐       │
│     │ No │Item │Sub │       │
│     ├────┼─────┼────┤       │
│     │ 1  │  A  │ D  │       │
│     ├────┼─────┼────┤       │
│     │ 2  │  B  │ E  │       │
│     ├────┼─────┼────┤       │
│     │ 3  │  C  │ F  │       │
│     └────┴─────┴────┘       │
│                             │
└─────────────────────────────┘
```

FIG. 7B

```
                                313
┌─────────────────────────────┐
│ No, Item, Sub,              │
│ 1, A, D,                    │
│ 2, B, E,                    │
│ 3, C, F,                    │
│                             │
└─────────────────────────────┘
```

FIG. 8A

```
                  304
┌─────────────────────┐
│ ┌────┬─────┬────┐   │
│ │ No │Item │Sub │   │
│ ├────┼─────┼────┤   │
│ │ 1  │  A  │ D  │   │
│ ├────┼─────┼────┤   │
│ │ 2  │  B  │ E  │   │
│ ├────┼─────┼────┤   │
│ │ 3  │  C  │ F  │   │
│ └────┴─────┴────┘   │
│ DATE:2015/1/1       │
│ PlanA               │
│      A+B            │
│ PlanB               │
│      C+D            │
└─────────────────────┘
```

FIG. 8B

```
                  314a
┌─────────────────────┐
│ DATE:2015/1/1       │
│ PlanA               │
│ A+B                 │
│ PlanB               │
│ C+D                 │
│                     │
└─────────────────────┘
```

FIG. 8C

```
                  314b
┌─────────────────────┐
│ No, Item, Sub,      │
│ 1, A, D,            │
│ 2, B, E,            │
│ 3, C, F,            │
│                     │
└─────────────────────┘
```

| No | Item | Sub |
|----|------|-----|
| 1  | A    | D   |
| 2  | B    | E   |
| 3  | C    | F   |

DATE: 2015/1/1

PlanA
    A+B
PlanB
    C+D

MARK WITH WRITING INSTRUMENT

PlanA
    A+B
PlanB
    C+D

| No | Item | Sub |
|----|------|-----|
| 1  | A    | D   |
| 2  | B    | E   |
| 3  | C    | F   |

DATE: 2015/1/1

PlanA
    A+B
PlanB
    C+D

| No | Item | Sub |
|----|------|-----|
| 1  | A    | D   |
| 2  | B    | E   |
| 3  | C    | F   |

| TABLE | | |
|---|---|---|
| Item | Sub | |
| | A | D |
| 1 | B | E |
| 2 | C | F |
| 3 | | |

FIG. 16B

TABLE,
Item,Sub
1,A,D
2,B,E
3,C,F

FIG. 16C

| TABLE | | |
|---|---|---|
| Item | Sub | |
| | A | D |
| 1 | B | E |
| 2 | C | F |
| 3 | | |

FIG. 16D

○, TABLE, ○,
○, Item,Sub
1,A,D
2,B,E
3,C,F

FIG. 16E

| TABLE | | |
|---|---|---|
| Item | Sub | |
| | A | D |
| 1 | B | E |
| 2 | C | F |
| 3 | | |

○ DENOTES BLANK CELL

IMAGE PROCESSING APPARATUS AND IMAGE PROCESSING METHOD FOR RECOGNIZING CHARACTERS IN CHARACTER STRING REGIONS AND TABLE REGIONS ON A MEDIUM

FIELD

Embodiments described herein relate generally to an image processing apparatus and an image processing method.

BACKGROUND

When a paper document is scanned by a scanner or the like, the resulting electronic image may be converted to a simple image file. The electronic image may be converted, using OCR technology, to a file having an image plus a character code. The electronic image may be converted to an Office Open XML (OOXML) format, which can be handled by an office application. In addition, a user may designate a specific region in the image for processing with an application for a specific work (for example, business form processing) so that only the designated region undergoes OCR-processing to acquire character codes. However, processing only specific information in the document into a form in which the information is handled as intended (for example, .txt if the information is a character string, and .csv if the information is a table) is not easy. For example, once .txt is designated for a document in which a table and a character string exist at the same time, even the table ends up being computerized in a .txt format. As a result, handling becomes cumbersome.

DETAILED DESCRIPTION

An image processing apparatus according to an embodiment includes an image reading unit, a character recognition unit, an operation unit, and a file generation unit. The image reading unit generates image information which includes at least one of a character string and a table. The character recognition unit recognizes characters and generates character information corresponding to each character included in one of the at least one of the character string and the table. The operation unit receives, from a user, a selected file format of an electronic file to be generated. The file generation unit generates an electronic file including the generated character information in accordance with the selected file format. The character recognition unit recognizes the characters and generates the character information in the generated image information in accordance with the one of the at least one of the character string and the table that corresponds to the selected file format.

Figure 1:
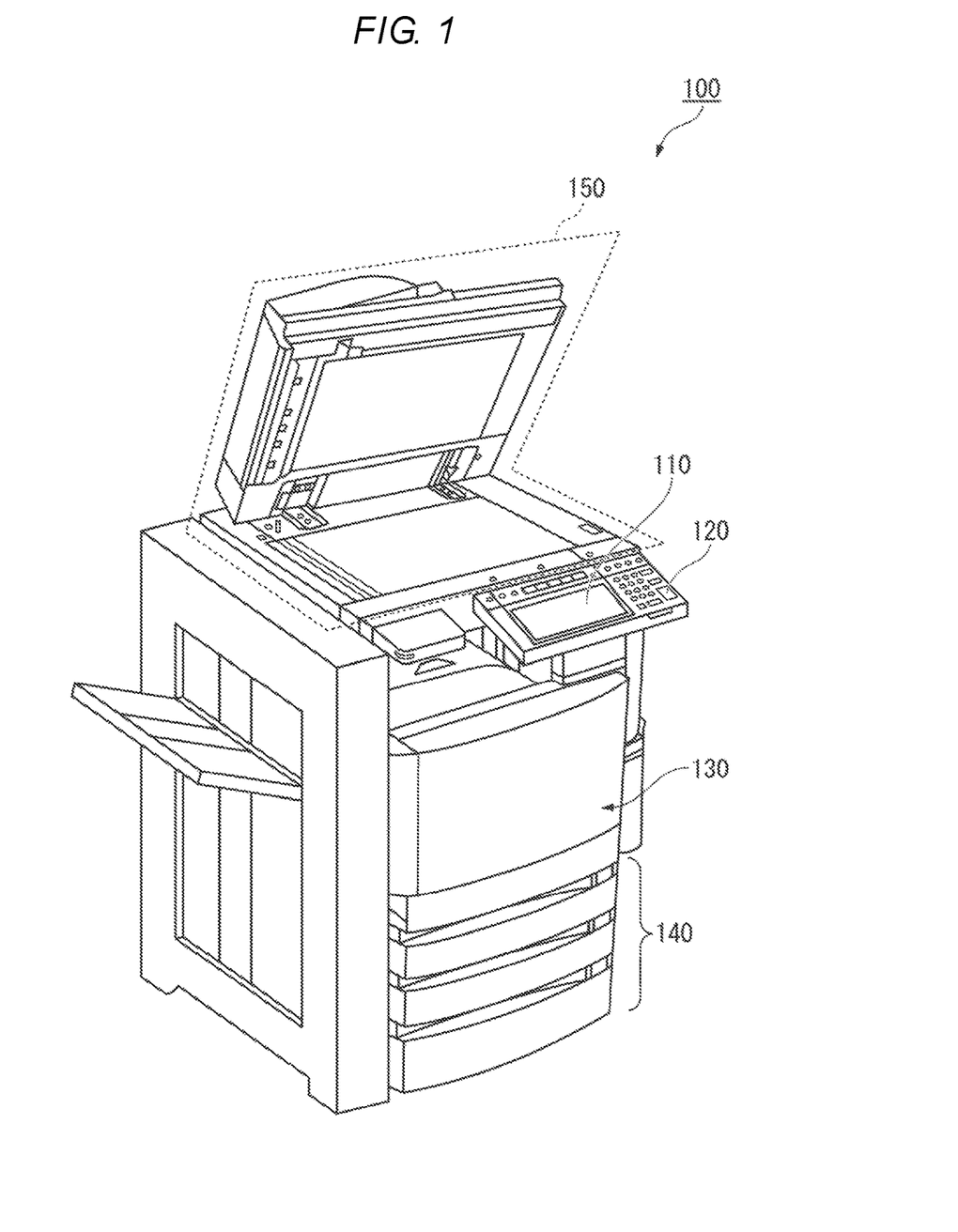
FIG. 1 is an external view illustrating an example of an image processing apparatus according to a first embodiment.

Hereinafter, an image processing apparatus 100 according to a first embodiment will be described with reference to the drawings. FIG. 1 is an external view illustrating an example of the image processing apparatus 100 according to the first embodiment. The image processing apparatus 100 is an image processing apparatus such as a multi-function printer. The image processing apparatus 100 includes a display 110, a control panel 120, a printing unit 130, an image formation medium accommodation unit 140, and an image reading unit 150. The printing unit 130 of the image processing apparatus 100 may fix a toner image or may be an inkjet apparatus.

The image processing apparatus 100 reads an image on an image formation medium to generate digital data, and generates a corresponding image file. The image formation medium is, for example, a piece of paper on which manuscripts, characters, images are printed. The image formation medium may be any medium insofar as the medium can be read by the image processing apparatus 100.

The display 110 is an image display device such as a liquid crystal display, an organic electroluminescent (EL) display, and the like. The display 110 displays various information regarding the image processing apparatus 100.

The control panel 120 includes a plurality of buttons. The control panel 120 receives an operation by a user. The control panel 120 outputs a signal in accordance with the operation by the user to a control unit 160 of the image processing apparatus 100. The display 110 and the control panel 120 may be integrated and configured as a touch panel. The control panel 120 is one example of the operation unit.

The printing unit 130 forms an image onto an image formation medium based on image information generated by the image reading unit 150 or image information received via a communication interface. The printing unit 130 forms an image through, for example, the following processing. An image forming unit of the printing unit 130 forms an electrostatic latent image onto a photosensitive drum based on the image information. The image forming unit of the printing unit 130 forms a visible image by applying a developer to the electrostatic latent image. A specific example of the developer includes a toner. A transferring unit of the printing unit 130 transfers the visible image onto the image formation medium. A fixing unit of the printing unit 130 fixes the visible image onto the image formation medium by heating and pressurizing the image formation medium. The image formation medium on which an image is formed may be an image formation medium accommodated in the image formation medium accommodation unit 140 or may be a manually fed image formation medium.

The image formation medium accommodation unit 140 accommodates image formation mediums to be used in image forming by the printing unit 130.

The image reading unit 150 reads image information of the reading target as light and shade. The image reading unit 150 records the read image information. The read image information may be transmitted to other information processing apparatus via a network. The recorded image information may be formed as an image onto the image formation medium by the printing unit 130. The image reading unit 150 is one example of the image input unit.

Figure 2:
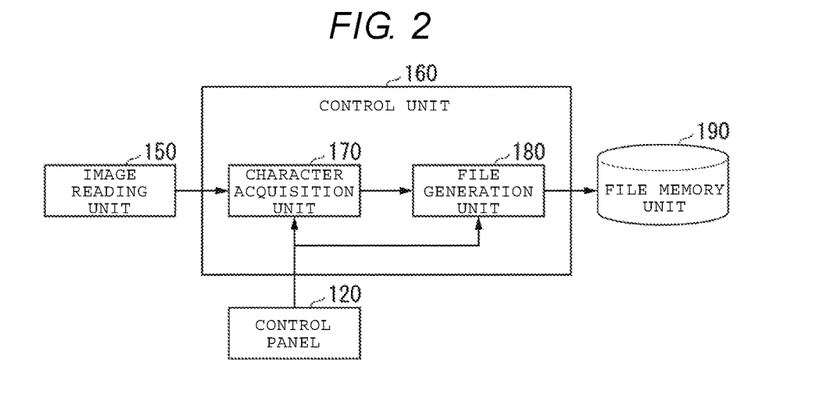
FIG. 2 is a block diagram of a control unit of the image processing apparatus.

FIG. 2 is a block diagram of the control unit 160 of the image processing apparatus 100 according to the first embodiment. The image processing apparatus 100 includes the display 110, the control panel 120, the printing unit 130, the image formation medium accommodation unit 140, the image reading unit 150, the control unit 160, and a file memory unit 190. The control unit 160 includes a character acquisition unit 170 and a file generation unit 180.

The control unit 160 controls operations of each unit of the image processing apparatus 100. The control unit 160 includes, for example, a central processing unit (CPU) and a random access memory (RAM). The control unit 160 functions as the character acquisition unit 170 and the file generation unit 180 by executing an image processing program.

The character acquisition unit 170 analyzes the read image information by recognizing characters, and generates character information. The character information is code information assigned to each character such as, for example, a character code. The character acquisition unit 170 is one example of the character recognition unit.

The file generation unit 180 generates an electronic file based on the character information and a file format received from the control panel 120. Examples of the file format include a text format (.txt) and a comma-separated values (CSV) format (.csv). When ".txt" is selected as the file format, the file generation unit 180 generates a text-format electronic file. When ".csv" is selected as the file format, the file generation unit 180 generates a CSV-format electronic file. The file format may be any file format that can be handled as an electronic file. When multiple tables are included in the read image information, the file generation unit 180 may output a plurality of CSV files or may output one CSV file after combining the tables.

The file memory unit 190 includes a memory device such as a magnetic hard disk device and a semiconductor memory device. The file memory unit 190 stores the electronic file generated by the file generation unit 180.

Figure 3:
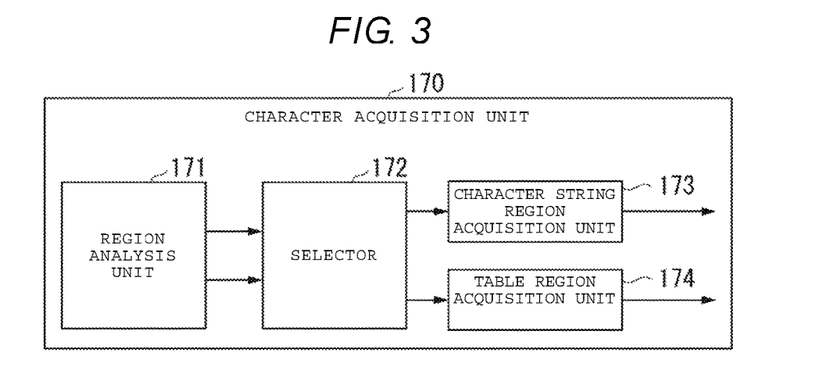
FIG. 3 is a block diagram of a character acquisition unit.

FIG. 3 is a block diagram n of the character acquisition unit 170 according to the first embodiment. The character acquisition unit 170 includes a region analysis unit 171, a selector 172, a character string region acquisition unit 173, and a table region acquisition unit 174.

The region analysis unit 171 analyzes which type of text element the read image information has. The text element is, for example, a character string or a table. When a table is included in the image information, the region analysis unit 171 outputs a table portion as a table region. When a character string is included in the image information, a character string portion is output as a character string region.

The selector 172 determines an output destination for the read image information according to the file format. Specifically, when the file format is the text format, the image information in the character string region is output to the character string region acquisition unit 173. When the file format is a CSV format, the image information in the table region is output to the table region acquisition unit 174.

The character string region acquisition unit 173 generates character information from the image information in the character string region. Specifically, the character string region acquisition unit 173 cuts out characters from the character string region. The character string region acquisition unit 173 recognizes the cut-out characters and generates the character information. A character recognition algorithm such as pattern matching is used for character recognition. Any other methods may be used for character recognition.

The table region acquisition unit 174 generates character information from the table region. Specifically, the table region acquisition unit 174 cuts out characters from the table portion of the image information. The table region acquisition unit 174 recognizes the cut-out characters and generates the character information. A character recognition algorithm such as pattern matching is used for character recognition. Any other methods may be used for character recognition.

Figure 4:
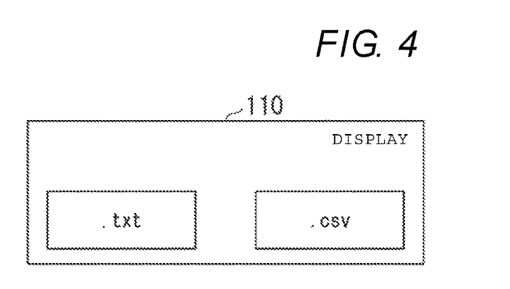
FIG. 4 illustrates an example display for selecting a file format.

FIG. 4 illustrates an example display for selecting a file format according to the first embodiment. The user operates the control panel 120 and selects a file format. Specifically, when ".txt" is selected, a text-format electronic file is generated. On the other hand, when ".csv" is selected, a CSV-format electronic file is generated. The image indicated in FIG. 4 is merely one example. Accordingly, the display may be configured in a form that is different from FIG. 4. For example, in 110 in FIG. 4, character string may be written instead of ".txt", and table may be written instead of ".csv".

Figure 5A:
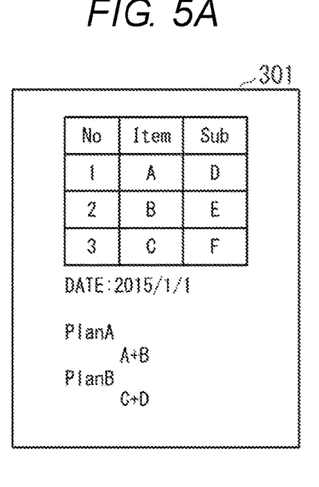
FIGS. 5A and 5B illustrate an example when a document that includes a character string and a table is analyzed.
Figure 5B:
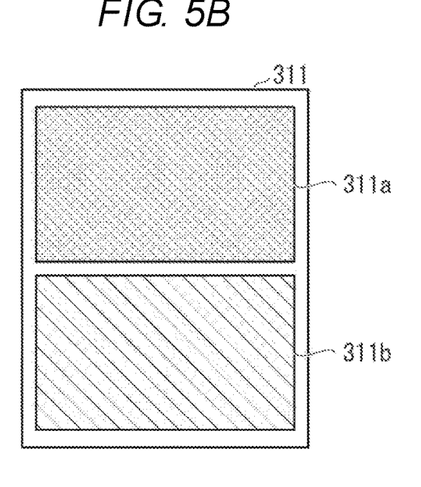

FIGS. 5A and 5B illustrate an example when a document that includes a character string and a table is analyzed by the character acquisition unit 170. In FIG. 5A, document 301 is a specific example of a document to be analyzed by the character acquisition unit 170. In FIG. 5A, document 301 includes a table at an upper part of the document, and includes a character string at a lower part of the document. In FIG. 5B, image 311 is image information that is output after being analyzed by the character acquisition unit 170. In FIG. 5B, image 311 includes FIG. 311*a*, which is a table region, at the upper part, and includes FIG. 311*b*, which is a character string region, at the lower part. The dots in the table region in FIG. 311*a* and diagonal lines in the character string region in FIG. 311*b* are yet to be formed into an image.

Figure 6A:
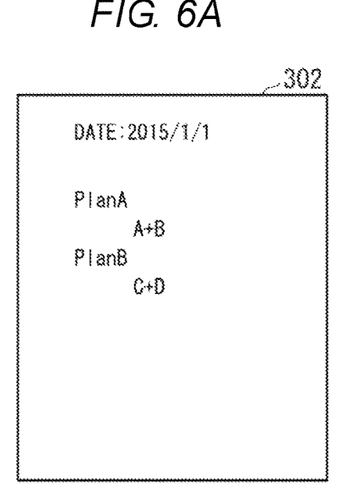
FIGS. 6A and 6B illustrate an example when an electronic file is generated from a document that includes a character string.
Figure 6B:
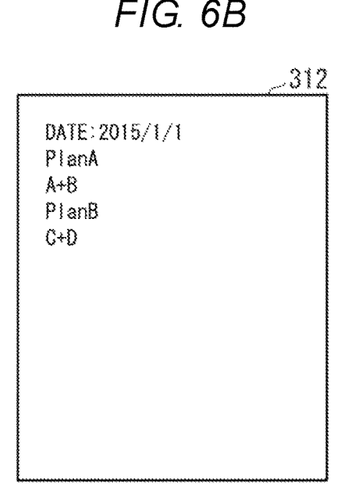

FIGS. 6A and 6B illustrate an example when an electronic file is generated from a document that includes a character string. In FIG. 6A, document 302 is a specific example of a document to be read by the image processing apparatus 100. The user operates the control panel 120 in advance and selects ".txt" as the file format. Once document 302 in FIG. 6A is read, the image processing apparatus 100 generates an electronic file for the character string region in the text format as indicated in image 312 in FIG. 6B.

Figure 7A:
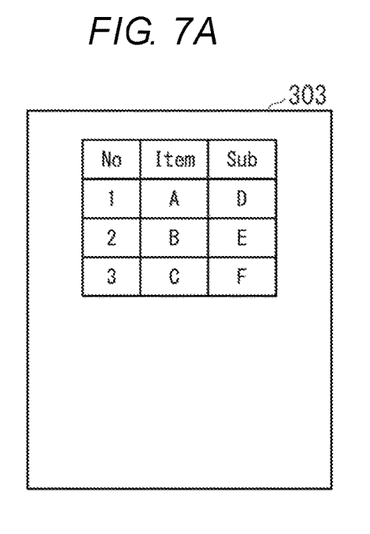
FIGS. 7A and 7B illustrate an example when an electronic file is generated from a document that includes a table.
Figure 7B:
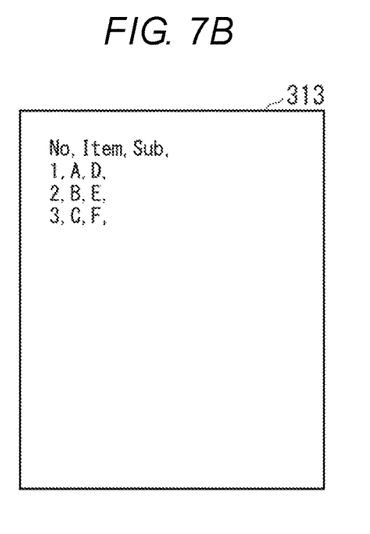

FIGS. 7A and 7B illustrate an example when an electronic file is generated from a document that includes a table. In FIG. 7A, document 303 is a specific example of a document to be read by the image processing apparatus 100. The user operates the control panel 120 in advance and selects ".csv" as the file format. Once document 303 in FIG. 7A is read, the image processing apparatus 100 generates an electronic file for the table region in the CSV format as indicated in image 313 in FIG. 7B.

Figure 8A:
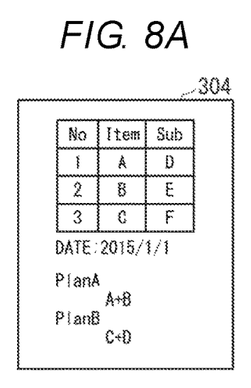
FIGS. 8A to 8C illustrate an example when an electronic file is generated from a document that includes a table and a character string.
Figure 8B:
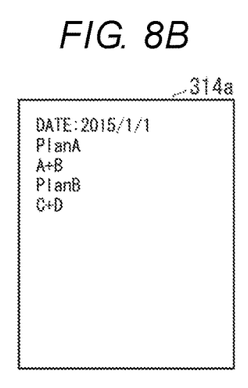
Figure 8C:
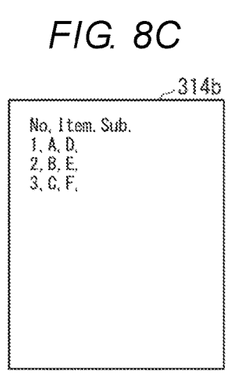

FIGS. 8A to 8C illustrate an example when an electronic file is generated from a document that includes a table and a character string. In FIG. 8A, document 304 is a specific example of a document to be read by the image processing apparatus 100. Once read by the image processing apparatus 100, document 304 in FIG. 8A is analyzed by the region analysis unit 171 and divided into a table region and a character string region indicated as 311a in FIG. 5B and 311b in FIG. 5B, respectively. The user operates the control panel 120 in advance and selects ".txt" as the file format. In this case, an electronic file for a region of 311b in FIG. 5B, which is the character string region, is generated in the text format as indicated in 314a in FIG. 8B. Alternatively, the user may select ".csv" as the file format. In this case, an electronic file for a region of 311a in FIG. 5B, which is the table region, is generated in the CSV format as indicated in 314b in FIG. 8C.

Figure 9:
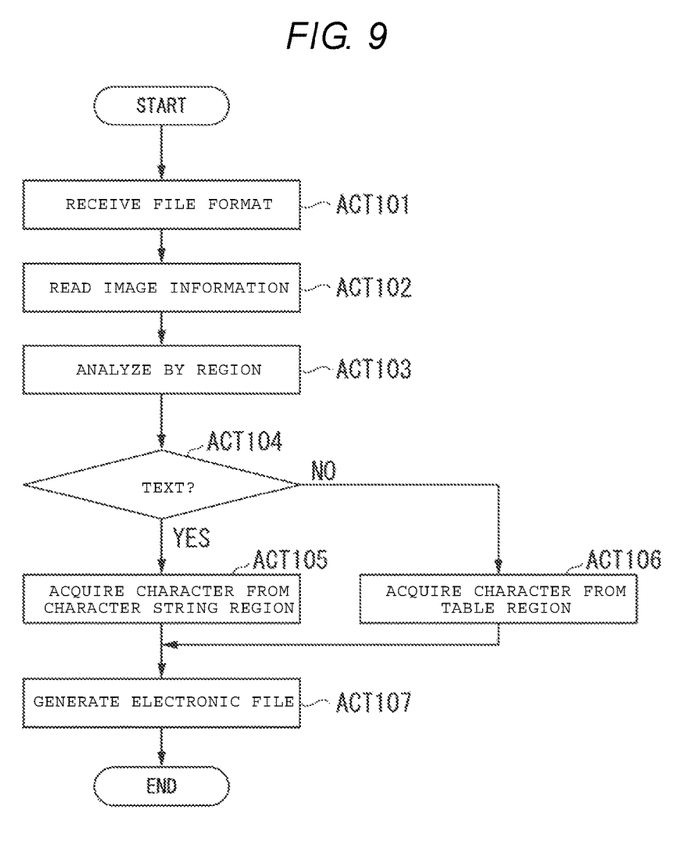
FIG. 9 is a flow chart illustrating an example sequence of operations for electronic file generation.

FIG. 9 is a flow chart illustrating an example sequence of operations for electronic file generation according to the first embodiment. First, the control panel 120 of the image processing apparatus 100 receives the selection of a file format from the user (ACT 101). The image reading unit 150 of the image processing apparatus 100 reads image information of the reading target (ACT 102). The region analysis unit 171 analyzes the read image information and outputs the image information by each text element (ACT 103).

The selector 172 determines whether the file format received by the control panel 120 is the text format or not (ACT 104). When the file format is the text format (ACT 104: YES), the character string region acquisition unit 173 generates character information from the image information in a character string region (ACT 105).

On the other hand, when the file format is the CSV format (ACT 104: NO), the table region acquisition unit 174 generates character information from the image information in a table region (ACT 106).

The file generation unit 180 generates an electronic file that includes the character information in the selected file format (ACT 107).

In the image processing apparatus 100 configured as described above, an electronic file for required data is generated only by a file format being selected from the control panel 120 and image reading being executed by the user. Accordingly, even when a table and a character string exist at the same time in an image, an electronic file for only a desired region can be generated in a desired format.

The image processing apparatus 100 may be configured so that the user can select an image format as the file format. Examples of the image file format include ".jpg", ".bmp", and ".gif". By having a configuration described above, an electronic file in which only an image region is extracted can be generated when the read image information includes a picture.

When there are multiple table regions in the read image information, the image processing apparatus 100 may output a summary in a first line of a CSV-file. For example, characteristics of a file, such as the number of elements of a table and the number of tables, are written in the summary. Having a configuration described above allows the user to find the number of elements of a table and the number of tables at a glance by referring to the summary, and user convenience can be improved.

Figure 10:
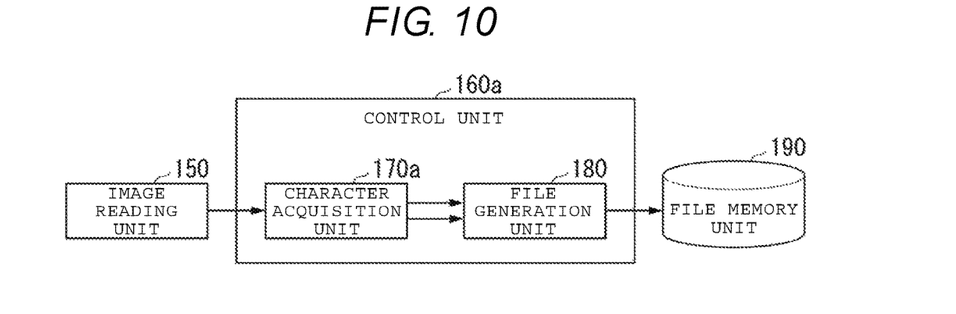
FIG. 10 is a block diagram illustrating a control unit of the image processing apparatus according to a second embodiment.

Hereinafter, the image processing apparatus 100 according to a second embodiment will be described. FIG. 10 is a block diagram illustrating a control unit 160a of the image processing apparatus 100 according to the second embodiment. Although the image processing apparatus 100 according to the second embodiment is different from that according to the first embodiment in that the control unit 160a is provided instead of the control unit 160, the rest of the configuration is the same. Hereinafter, points different from the first embodiment will be described.

The control unit 160a controls an operation of each unit of the image processing apparatus 100. The control unit 160a functions as a character acquisition unit 170a by executing an image processing program. The character acquisition unit 170a is different from the character acquisition unit 170 of the first embodiment in that the character acquisition unit 170a determines a file format, however, the rest of the configuration is the same.

Figure 11:
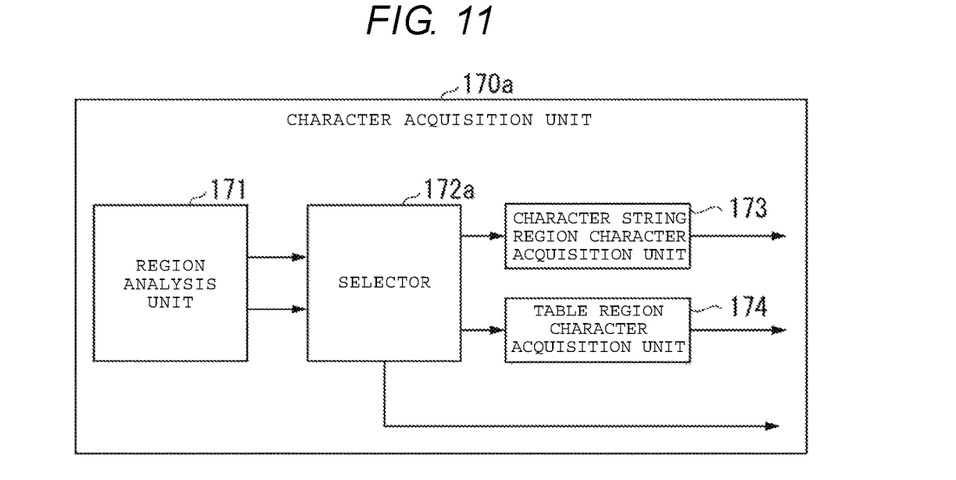
FIG. 11 is a block diagram of a character acquisition unit according to the second embodiment.

FIG. 11 is a block diagram of the character acquisition unit 170a according to the second embodiment. Although the character acquisition unit 170a is different from the character acquisition unit 170 according to the first embodiment in that a selector 172a is provided instead of the selector 172, the rest of the configuration is the same. The character acquisition unit 170a is one example of the character recognition unit.

Hereinafter, points different from the first embodiment will be described.

The selector 172a determines a file format based on text elements of image information. For example, the selector 172a stores a file format to which priority is given in advance (for example, the CSV format takes priority when the image information includes a table). When the file format to which priority is given in advance is the CSV format, CSV-output with respect to the table region takes priority. When the read image information has a character string region only, the selector 172a determines the text format as the file format. On the other hand, when the read image information has a character string region and a table region, the selector 172a determines the CSV format as the file format in accordance with the file format priority. The selector 172a determines an output destination for the read image information in accordance with the file format. The selector 172a outputs the file format to the file generation unit 180. The selector 172a is one example of the selector unit.

Figure 12:
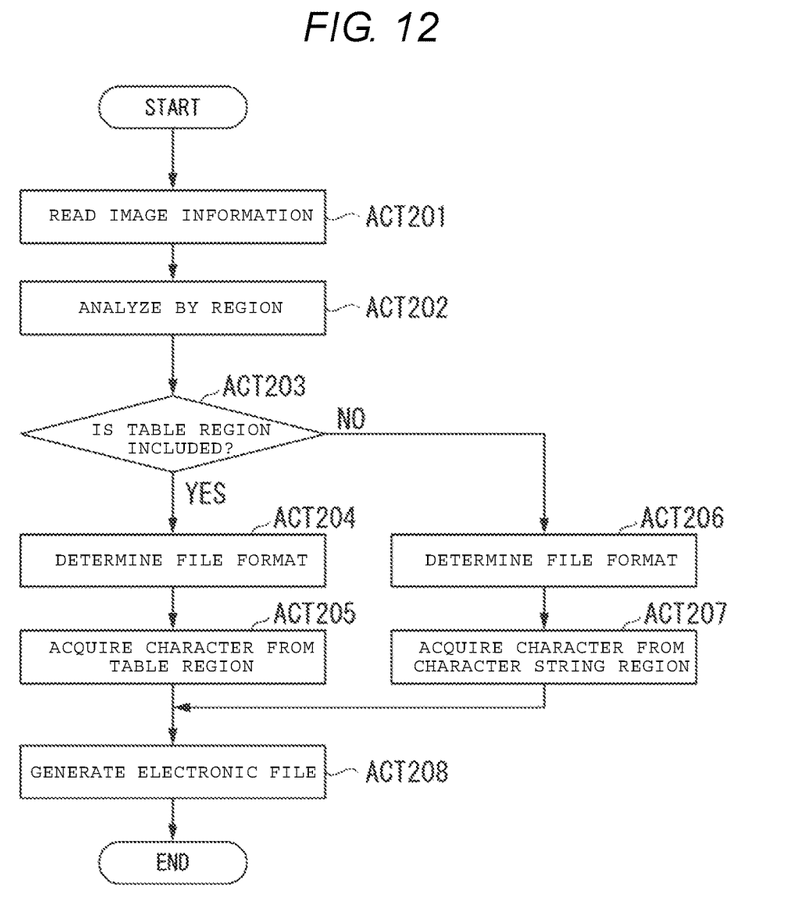
FIG. 12 is a flow chart illustrating an example sequence of operations for electronic file generation according to the second embodiment.

FIG. 12 is a flow chart illustrating an example sequence of operations for electronic file generation according to the second embodiment. A priority file format is stored in the selector 172a in advance. For example, the selector 172a prioritizes a table format in the present flow chart. First, the image reading unit 150 of the image processing apparatus 100 reads image information of the reading target (ACT 201). The region analysis unit 171 analyzes the read image information and outputs the image information for each text element (ACT 202).

The selector 172a determines whether a table region is included in the image information or not (ACT 203). When a table region is included in the image information (ACT 203: YES), ACTs 204 and 205 are executed. The selector 172a determines the CSV format as the file format (ACT 204). The table region acquisition unit 174 generates character information from the image information in the table region (ACT 205).

On the other hand, when a table region is not included in the image information (ACT 203: NO), ACT 206 and ACT 207 are executed. The selector 172a determines the text format as the file format (ACT 206). The character string region acquisition unit 173 generates character information from the image information in the character string region (ACT 207). The file generation unit 180 generates an electronic file that includes the character information in the selected file format (ACT 208).

In the image processing apparatus 100 configured as described above, an electronic file is generated when image reading is executed by the user. Accordingly, the user can acquire an electronic file with fewer work steps than the first embodiment.

Figure 13:
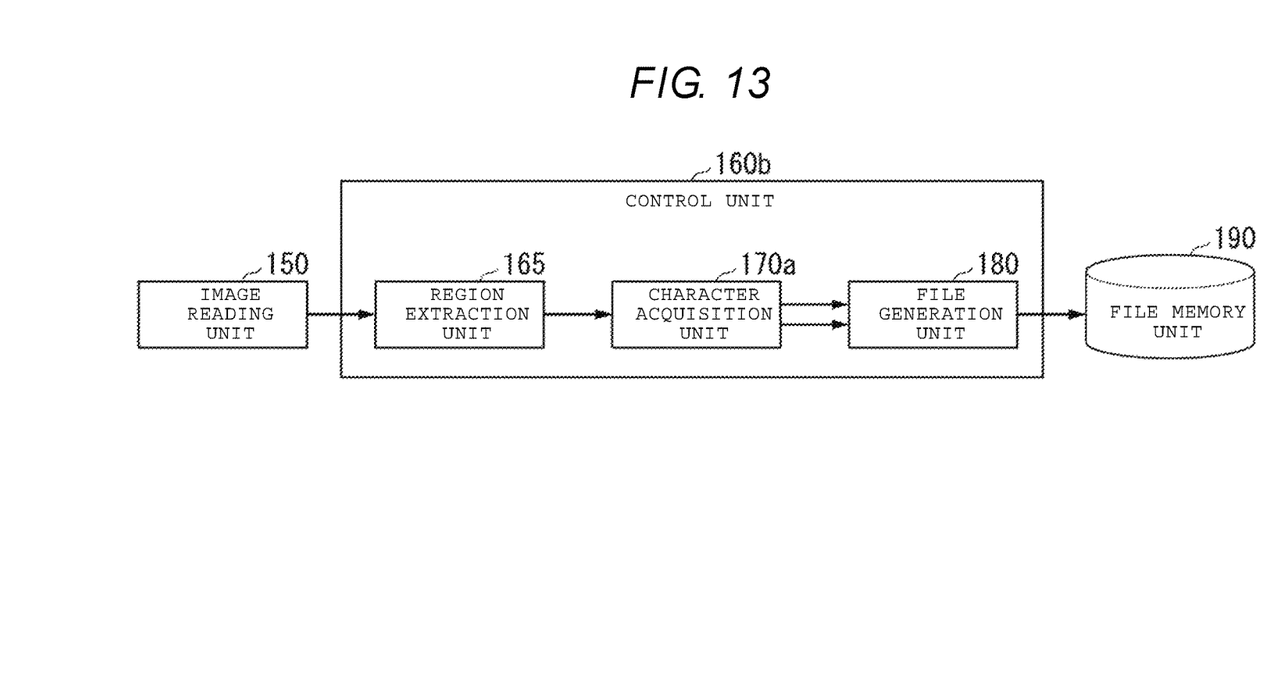
FIG. 13 is a block diagram illustrating a control unit of the image processing apparatus according to a third embodiment.

Hereinafter, the image processing apparatus 100 according to a third embodiment will be described. FIG. 13 is a block diagram illustrating a control unit 160*b* of the image processing apparatus 100 according to the third embodiment. Although the image processing apparatus 100 according to the third embodiment is different from that according to the first embodiment in that the control unit 160*b* is provided instead of the control unit 160, the rest of the configuration is the same. Hereinafter, points different from the first embodiment will be described.

The control unit 160*b* controls each unit of the image processing apparatus 100. The control unit 160*b* is different from the control unit 160 according to the first embodiment in that the control unit 160*b* further includes a region extraction unit 165 and functions as the character acquisition unit 170*a* instead of the character acquisition unit 170 by executing an image processing program. The rest of the configuration is the same.

The region extraction unit 165 extracts, from the read image information, a region marked with a marker pen of a specific color. The region extraction unit 165 outputs the extracted image information to the character acquisition unit 170*a*. The marker pen is not limited as long as the marker pen can draw on the reading target. The specific color is, for example, red. The specific color is not limited to red. A method for differentiating a drawn part based on density and color degree may be employed for extracting. Any other methods may be employed for extracting.

Figure 14A:
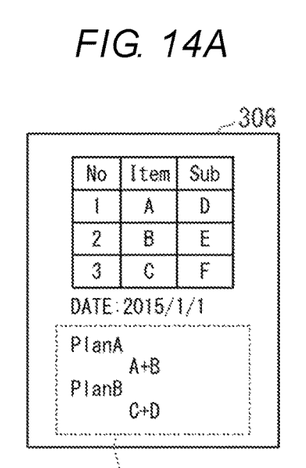
FIGS. 14A to 14D illustrate an example of region extraction processing according to the third embodiment.
Figure 14B:
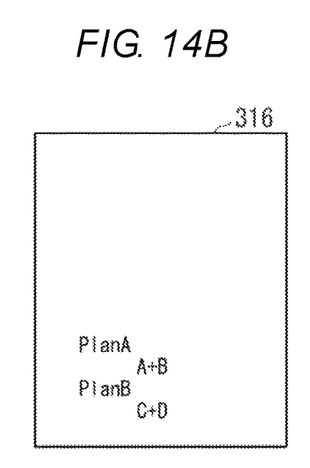
Figure 14C:
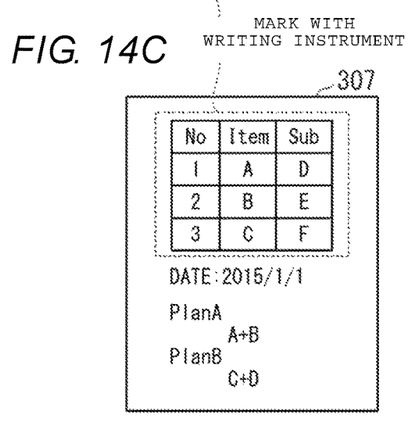
Figure 14D:
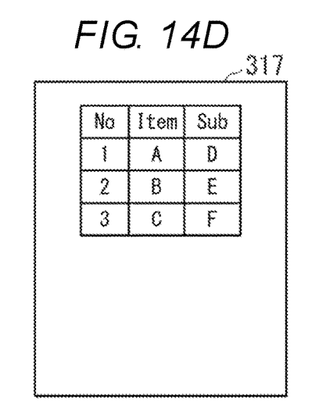

FIGS. 14A to 14D illustrate a specific example of processing of the region extraction unit 165 according to the third embodiment. In FIG. 14A, document 306 is a specific example of a document of which a part of a character string is marked with the marker pen. The region extraction unit 165 extracts, from the read image information, a region marked with the marker pen. In FIG. 14B, image 316 is a specific example of the extracted image information. The control unit 160*b* generates an electronic file based on image 316 in FIG. 14B. In FIG. 14C, document 307 is a specific example of a document in which a table is marked with the marker pen. The region extraction unit 165 extracts, from the read image information, a region marked with the marker pen. In FIG. 14D, image 317 is a specific example of the extracted image information. The control unit 160*b* generates an electronic file based on image 317 in FIG. 14D.

Figure 15:
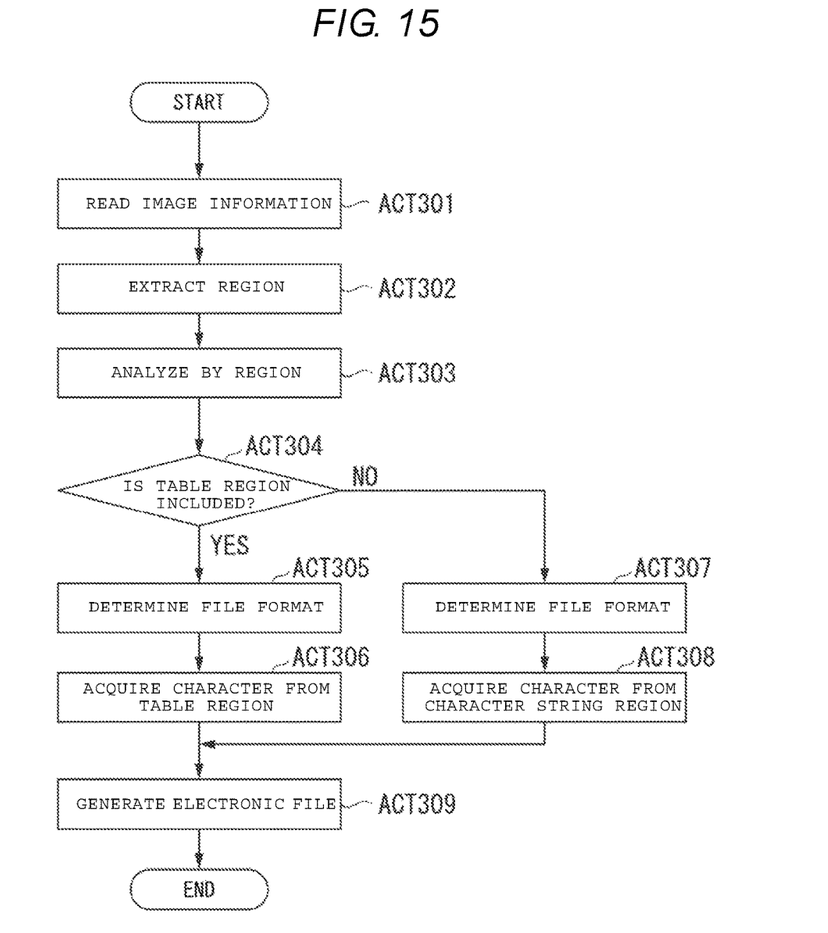
FIG. 15 is a flowchart illustrating an example sequence of operations for electronic file generation according to the third embodiment.

FIG. 15 is a flow chart illustrating an example sequence of operations for electronic file generation according to the third embodiment. A priority file format is stored in the selector 172*a* in advance. The selector 172*a* prioritizes a table format in the present flow chart. First, the image reading unit 150 of the image processing apparatus 100 reads image information of the reading target (ACT 301). The region extraction unit 165 extracts, from the read image information, a region marked with the marker pen (ACT 302). The region analysis unit 171 analyzes the extracted image information and outputs the image information by each configuration element (ACT 303).

The selector 172*a* determines whether a table region is included in the image information (ACT 304). When a table region is included in the image information (ACT 304: YES), ACT 305 and ACT 306 are executed. The selector 172*a* determines the CSV format as the file format (ACT 305). The table region acquisition unit 174 generates character information from the image information in the table region (ACT 306).

On the other hand, when a table region is not included in the image information (ACT 304: NO), ACT 307 and ACT 308 are executed. The selector 172*a* determines the text format as the file format (ACT 307). The character string region acquisition unit 173 generates character information from the image information in the character string region (ACT 308).

The file generation unit 180 generates an electronic file that includes the character information in the selected file format (ACT 309).

In the image processing apparatus 100 configured as described above, only a region marked with the marker pen is subject to image reading, as selected by the user. Thus, an electronic file to which a file format for the marked region is applied is generated. Accordingly, the user can easily acquire an electronic file obtained by processing a desired region only.

Figure 16A:
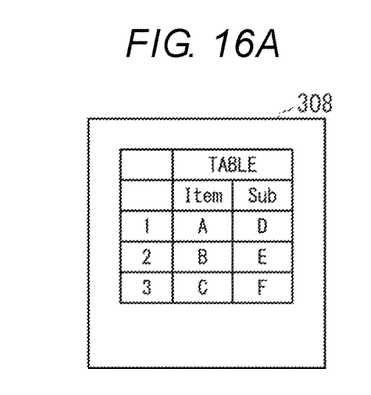
FIGS. 16A to 16E illustrate an example when a CSV-file is generated from a document in which the number of columns for each row in a table varies.
Figure 16B:
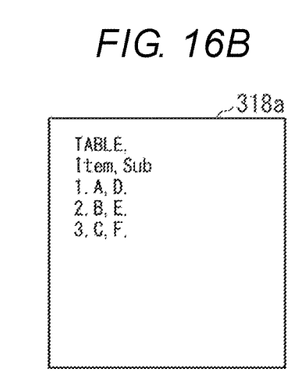
Figure 16C:
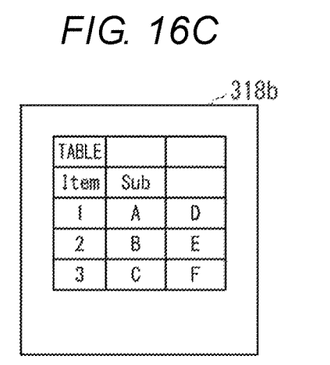
Figure 16D:
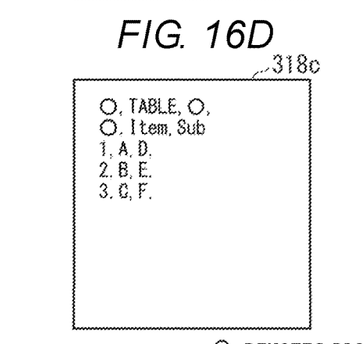
Figure 16E:
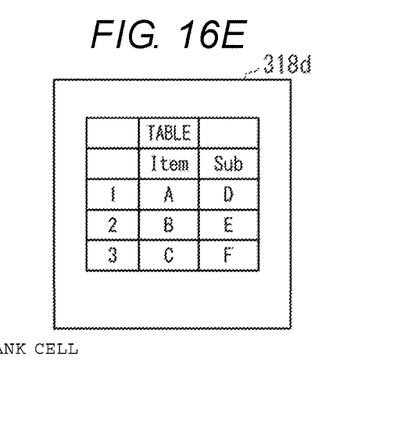

FIGS. 16A to 16D are views illustrating an example when a CSV-file is generated from a document in which the number of columns for each row in a table varies. In FIG. 16A, document 308 is a specific example of a document read by the image reading unit 150. In document 308 in FIG. 16A, the number of columns for the first row is two, and the numbers of columns for the second row and subsequent rows are three. In FIG. 16B, image 318*a* is an example of an image illustrating the content of a CSV-file when the CSV-file is generated simply from document 308 in FIG. 16A. When the number of columns for each row varies, a CSV-file in which the number of commas for each row varies is generated. For this reason, when the CSV-file is opened through spreadsheet software, in some cases, as illustrated in image 318*b* in FIG. 16C, positions of cells in the table are different from those of document 308 in FIG. 16A, resulting in deteriorated user operability. For this reason, the file generation unit 180 may generate a CSV-file in which the number of columns for each row does not vary. Specifically, when the number of columns for each row varies, a blank cell and combined cells in the table are output so as to be separated with a space and a comma. In FIG. 16D, image 318*c* is an example of an image illustrating the content of the CSV-file when the CSV-file is generated from document 308 in FIG. 16A. When the CSV-file of image 318*c* in FIG. 16D is opened through the spreadsheet software, positions of cells are displayed the same as those of document 308 in FIG. 16A, as illustrated in image 318*d* in FIG. 16E. By having a configuration described above, user operability improves.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image processing apparatus comprising:
an image reading device configured to read a medium and generate corresponding image information;
a control panel configured to receive, from a user, a selected file format of an electronic file to be generated; and
a processor programmed in accordance with an image processing program to function as:
a character recognition unit to:
recognize characters included in any character string region in the image information and in any table region in the image information,
select, in accordance with the selected file format, the recognized characters included in either the character string region in the image information or the table region in the image information, and
generate character information corresponding to each of the recognized characters that are selected, and
a file generation unit to generate an electronic file including the generated character information in accordance with the selected file format.

2. The apparatus according to claim 1, wherein, when the selected file format is a text format, the processor functioning as the character recognition unit generates character information from a character string included in the character string region in the image information.

3. The apparatus according to claim 1, wherein, when the selected file format is a CSV format, the processor functioning as the character recognition unit generates character information from a table included in the table region in the image information.

4. The apparatus according to claim 1, wherein, when the selected file format is a CSV format and the table region in the image information includes a table in which a number of columns for each row therein varies, the processor functioning as the file generation unit generates the electronic file such that each row of a generated table of the electronic file has the same number of columns.

5. The apparatus according to claim 1, wherein the processor functioning as the file generation unit generates the electronic file including a plurality of tables corresponding to a plurality of table regions included in the image information.

6. The apparatus according to claim 5, wherein the processor functioning as the file generation unit generates the electronic file including a summary indicating a number of generated tables and a number of elements of the tables.

7. The apparatus according to claim 1, wherein the selected file format is selected from one of .txt, .csv, .jpg, .bmp, and .gif.

8. An image processing apparatus comprising:
an image reading device configured to read a medium and generate corresponding image information; and
a processor programmed in accordance with an image processing program to function as:
a character recognition unit to:
store a predetermined priority file format,
recognize characters included in any character string region in the image information and in any table region in the image information,
determine a file format based on the predetermined priority file format and whether the image information includes the character string region or the table region, and
generate character information corresponding to each of the characters included in one of the character string region and the table region in accordance with the determined file format; and
a file generation unit to generate an electronic file including the generated character information in accordance with the determined file format.

9. The apparatus according to claim 8, wherein the processor is programmed in accordance with the image processing program to further function as:
a region extraction unit that extracts, from the image information, a region marked with a writing instrument, wherein the processor functioning as the character recognition unit generates the character information from characters included in the region marked with a writing instrument.

10. The apparatus according to claim 8, wherein, when the image information has a table region in which a number of columns for each row therein varies, the processor functioning as the file generation unit generates the electronic file such that each row of a generated table of the electronic file has the same number of columns.

11. The apparatus according to claim 8, wherein, when the determined file format is a text format, the processor functioning as the character recognition unit generates character information from a character string included in the image information in which the character string and a table are both included.

12. The apparatus according to claim 8, wherein, when the determined file format is a CSV format, the character recognition unit generates character information from a table included in the character string region in the image information.

13. The apparatus according to claim 8, wherein, when the determined file format is a CSV format and the table region in the image information includes a table in which a number of columns for each row therein varies, the processor functioning as the file generation unit generates the electronic file such that each row of a generated table of the electronic file has the same number of columns.

14. The apparatus according to claim 8, wherein the processor functioning as the file generation unit generates the electronic file including a plurality of tables corresponding to a plurality of table regions included in the image information.

15. The apparatus according to claim 14, wherein the processor functioning as the file generation unit generates the electronic file including a plurality of tables corresponding to a plurality of table regions included in the image information.

16. The apparatus according to claim 8, wherein the selected file format is selected from one of .txt, .csv, .jpg, .bmp, and .gif.

17. An image processing method comprising the steps of:
reading a medium and generating corresponding image information;
recognizing characters included in any character string region in the image information and in any table region in the image information;
receiving a selection of a file format of an electronic file to be generated;
selecting, in accordance with the selected file format, the recognized characters included in either the character string region in the image information or the table region in the image information;
generating character information corresponding to each of the recognized characters that are selected; and generating an electronic file including the generated character information in accordance with the selected file format.

18. The method according to claim 17, wherein:

when the selected file format is a text format, the character information is generated from a character string included in the character string region in the image information, and when the selected file format is a CSV format, the character information is generated from a table included in the table region in the image information.

19. The method according to claim 17, wherein, when the selected file format is a CSV format and the table region in the image information includes a table in which a number of columns for each row therein varies, the electronic file is generated such that each row of a generated table of the electronic file has the same number of columns.

20. The method according to claim 17, wherein the electronic file is generated to include a plurality of tables corresponding to a plurality of table regions included in the image information.

\* \* \* \* \*